March 1, 1960 J. W. GRIFFITH 2,927,298

DEVICE FOR MOUNTING ELECTRONIC COMPONENTS

Filed Jan. 14, 1957

INVENTOR.
Joseph W. Griffith
BY Oliver D. Olson
Agent 2,927,298

DEVICE FOR MOUNTING ELECTRONIC COMPONENTS

Joseph W. Griffith, Beaverton, Oreg.

Application January 14, 1957, Serial No. 633,986
2 Claims. (Cl. 339—198)

This invention relates to devices for mounting electronic components, and has for its principal object the provision of a device by which to facilitate the assembly of components of electronic circuits.

Another important object of the present invention is to provide a device for mounting or interconnecting components of circuits employed in electronic instruments.

A further important object of this invention is to provide a device by which to accommodate preassembly of components for ultimate incorporation into the electrical circuits of electronic instruments.

Still another important object of this invention is to provide a device by which to facilitate the connection of electronic components to printed circuits.

A still further important object of the present invention is to provide a mounting device of the class described which is capable of attachment to an electronic instrument chassis, tube socket, or other suitable support, with speed and facility.

The foregoing and other objects and advantages of the present invention will appear from the following detailed description, taken in connection with the accompanying drawing, in which.

Figures 1, 2, 3, 4, 5, 6, 7, 8, 9:
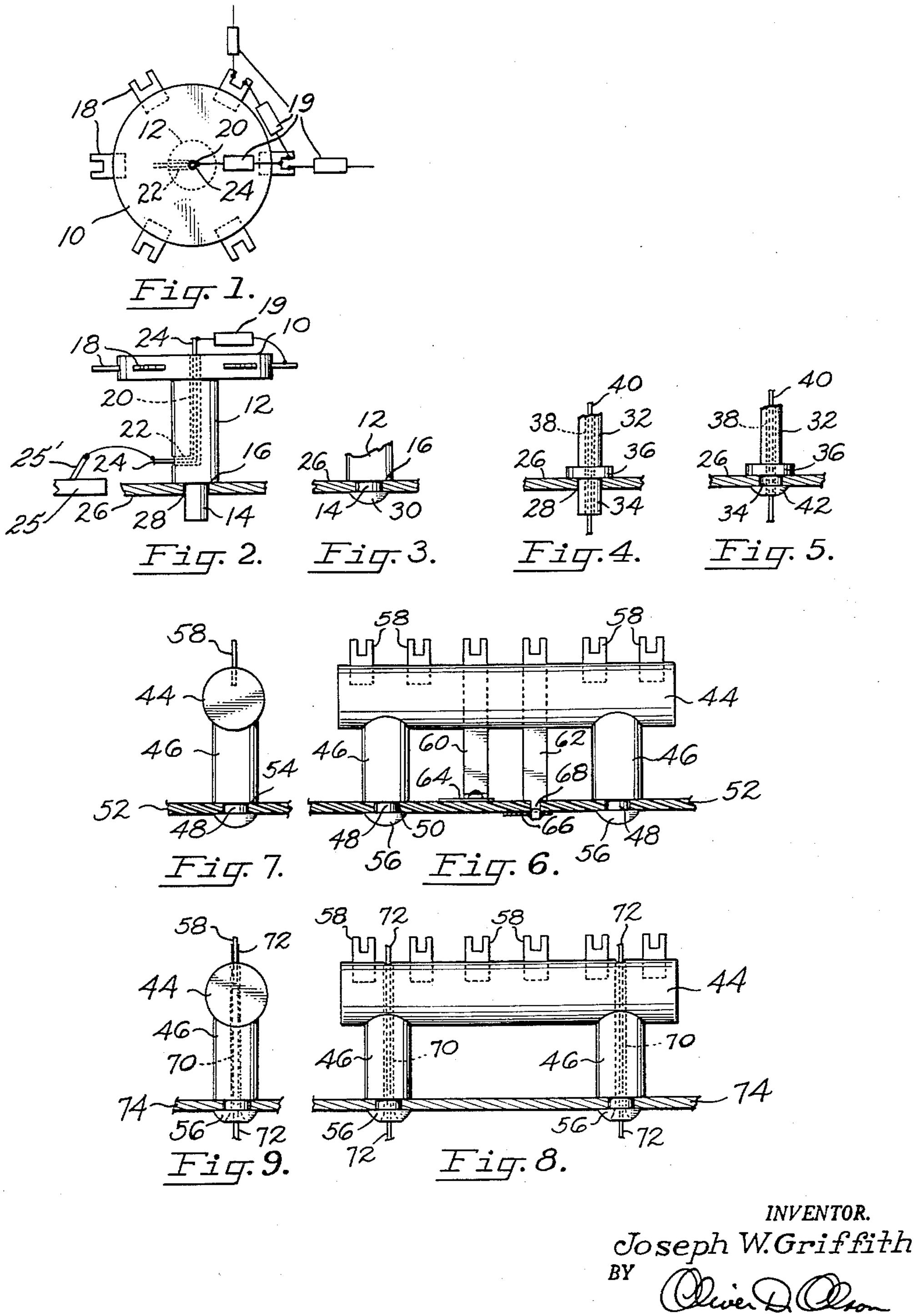
Figure 1 is a plan view of a mounting device embodying features of the present invention.
Figure 2 is a view in side elevation of the mounting device of Figure 1, the same being shown in an intermediate stage of attachment to a support.
Figure 3 is a fragmentary view in side elevation of the mounting device shown in Figure 2, and showing the same in the final stage of attachment to a support.
Figure 4 is a fragmentary view in side elevation of a modified form of the mounting device shown in Figure 2, the same being shown in an intermediate stage of attachment to a support.
Figure 5 is a fragmentary view in side elevation of the device of Figure 4 and showing the same in the final stage of attachment to the support.
Figure 6 is a view in side elevation of a further modified form of mounting device, shown in the final stage of attachment to a support.
Figure 7 is an end view of the device shown in Figure 6.
Figure 8 is a view in side elevation of a still further modified form of the device shown in Figure 6.
Figure 9 is an end view of the device shown in Figure 8.

In its broad concept, the mounting device of the present invention comprises a head carrying a plurality of spaced terminal lugs, a pedestal supporting the head at one end thereof and having projecting from the opposite end an extension made of a material capable of being deformed by the application of heat and pressure. Although the head and pedestal may be made of any electrically nonconducting material, it is preferred that these sections, together with the extension, be molded of a synthetic thermoplastic resin, such as nylon.

In the embodiment illustrated in Figures 1, 2 and 3, the mounting device comprises a flat cylindrical head 10 supported centrally upon an elongated cylindrical pedestal 12. Projecting from the end of the pedestal opposite the head is a longitudinal extension 14 of reduced diameter, thereby forming a shoulder 16 at the junction of the pedestal and extension.

The head and pedestal may be made of any electrically noconducting material, such as ceramic, glass, rubber, or synthetic thermosetting or thermoplastic resins, and there is secured in the head at circumferentally spaced positions a plurality of electrically conducting terminal lugs 18, which project radially from the periphery thereof. It is understood that these lugs function to support or interconnect electronic components, such as the resistors 19 illustrated in Fig. 1, as by soldering.

If desired, a longitudinal bore 20 may be provided through the head and a portion of the length of the pedestal, to intercept a radial bore 22 formed in the pedestal adjacent the end opposite the head. The opening provided by the bores may be utilized to contain an electrical conductor 24. Alternatively, if the mounting device is constructed by a molding technique, the electrical conductor 24 may be molded permanently into the device during manufacture. In either case the conductor 24 may function to interconnect the terminal 25' of a tube socket 25 and an electronic component such as the resistor 19 shown in Fig. 2, as by soldering.

The extension 14 is formed of a heat deformable substance, for example nylon or other synthetic thermoplastic resin, and serves to provide attachment of the mounting device to a support, in the following manner: A support, such as the metal chassis 26 of an electronic instrument, is provided with a transverse hole 28 therethrough at the desired location for the mounting device. This opening is proportioned to receive the extension 14 therethrough, with the shoulder 16 at the base end of the pedestal resting upon the support. Heat then is appplied to the projecting end of the extension as by means of a soldering iron or other heated element, whereupon the projecting end of the extension is swaged over, in the manner of a rivet, to form an enlarged head 30 on the side of the support opposite the pedestal shoulder. In this manner the mounting device is attached securely to the support.

In Figs. 4 and 5 of the drawing, there is shown a modified form of pedestal and extension. The pedestal 32 and extension 34 are illustrated as being of the same diameter, with an enlarged flange 36 being provided at the base of the pedestal to provide a shoulder at the junction of the base and extension. In addition, the base and extension are shown to be provided with a longitudinal bore 38 extending therethrough for the purpose of receiving an electrical conductor 40 for such purposes as interconnecting electrical components which are located on opposite sides of the support 26.

It will be understood that the electrical conductor 40 may be molded into the mounting device as an integral part thereof, during molding of the mounting device, in the manner explained hereinbefore.

The swaging over of the extension 34 to form the enlarged head 42 illustrated in Figure 5, is accomplished as follows: If the longitudinal bore 38 is provided for receiving an electrical conductor 40 freely therethrough, the heated tool used for swaging is provided with a pointed end for reception in the longitudinal bore, whereby to prevent sealing of the bore during the swaging operation. If the electrical conductor is molded into the mounting device, a conventional heated tool may be drawn around the conductor to swage the extension.

In the modification illustrated in Figures 6 and 7, the mounting device comprises an elongated cylindrical head 44, of electrically nonconducting material adapted to be supported adjacent its ends by spaced pedestals 46. Extensions 48 of reduced diameter project from the ends of the pedestals opposite the head, and these extensions are formed of heat deformable substance, in the manner and for the purpose of the extensions described hereinbefore. Spaced holes 50 are provided in a support 52 for receiving the extensions to the limit of the shoulders 54 formed at the junction of the extensions and bases of the pedestals, in the manner previously described. The extensions then may be swaged over to form the enlarged heads 56, whereby to secure the mounting device firmly to the support.

The elongated cylindrical head supports a plurality of spaced terminal lugs 58. These lugs may be molded into the head to form an integral part of the latter, in the event the mounting device is manufactured by a molding technique, as previously described. If desired, the terminal lugs such as those indicated at 60, 62 may be proportioned to extend from the head for convenient connection to desired electrical circuits. For example, in the embodiment illustrated in Figure 6, the support 52 is shown to be constructed of electrically nonconducting plastic material, upon the surface of which are formed the conducting elements 64, 66 of a printed circuit. The terminal lugs 60, 62 may be connected to these printed circuit elements in any manner desired. As illustrated, the terminal lug 60 is secured to the conducting element 64 of a printed circuit by overlaying the bent terminal end of the lug upon the conducting printed element and connecting the two together by soldering or other means. In the case of terminal lug 62, its terminal end is received in an opening 68 formed in the electrically nonconducting plastic support 52, the opening interrupting the printed conducting element 66. Then, for example, solder may be deposited around the terminal lug within the opening and upon the adjacent surface of the printed conducting strip.

In the modification illustrated in Figures 8 and 9, the mounting device of Figure 6 is provided with longitudinal openings 70 extending through the head 44, pedestal 46 and extension 48, in a manner analogous to the modification illustrated in Figures 4 and 5, for the purpose of receiving therethrough an electrical conductor 72 by which to interconnect electrical components positioned on opposite sides of the support 74. As previously explained, the electrical conductor 72 alternatively may be molded into the mounting device as an integral part thereof, if so desired.

From the foregoing it is believed to be apparent that the present invention affords novel means by which to facilitate the mounting or interconnection of electronic components for the circuits of electrical or electronic instruments. The construction provided by this invention affords attachment of the mounting devices upon the chassis or other support of such instruments with maximum speed and facility. The mounting device may be made of any suitable electrically nonconducting material, and it is particularly adaptable to manufacture by the molding of synthetic thermoplastic resins. This technique not only affords production at minimum cost, but it also facilitates the integration therewith of terminal lugs and other electrically conducting elements, as desired.

It will be apparent to those skilled in the art that the various details of construction described hereinbefore may be modified as desired, without departing from the scope and spirit of this invention. Accordingly, it is to be understood that the foregoing description is primarily illustrative of the invention and is not to be considered as limiting the scope thereof.

Having now described my invention and the manner in which the same may be used, what I claim as new and desire to secure by Letters Patent is:

1. A device for mounting electronic components upon a support, comprising a unitary structure molded of electrically non-conducting heat deformable thermoplastic resin and including a head having a plurality of electrically conducting terminal lugs molded into it at spaced intervals, a pedestal supporting the head at one end, and a mounting extension projecting from the end of the pedestal opposite the head, the extension being adapted to being received through an opening in the support, the extension being smaller in cross section than the pedestal at the junction of the pedestal and the extension, in order to form a laterally extending shoulder therebetween for abutment against the side of a support facing the pedestal and head, the extension being capable of being swaged over by application thereto of a heated swaging tool to form an enlarged securing head on the side of a support opposite the shoulder.

2. The device of claim 1 wherein the head, pedestal and extension are provided with a continuous longitudinal bore therethrough for receiving an electrical conductor for interconnecting electronic components on opposite sides of a support.

References Cited in the file of this patent

UNITED STATES PATENTS

| | | |
|---|---|---|
| 672,332 | Roche | Apr. 16, 1901 |
| 1,122,280 | Kempshall | Dec. 29, 1914 |
| 2,436,756 | Larkin | Feb. 24, 1948 |
| 2,647,990 | Peterson | Aug. 4, 1953 |
| 2,649,558 | Franz | Aug. 18, 1953 |
| 2,667,624 | Bels | Jan. 26, 1954 |
| 2,705,346 | Schlaback et al. | Apr. 5, 1955 |
| 2,754,490 | Schnoll | July 10, 1956 |